Dec. 19, 1933.  U. NISTRI  1,940,434
WIND DRIVEN PHOTOMACHINE GUN
Filed April 21, 1932    2 Sheets-Sheet 1
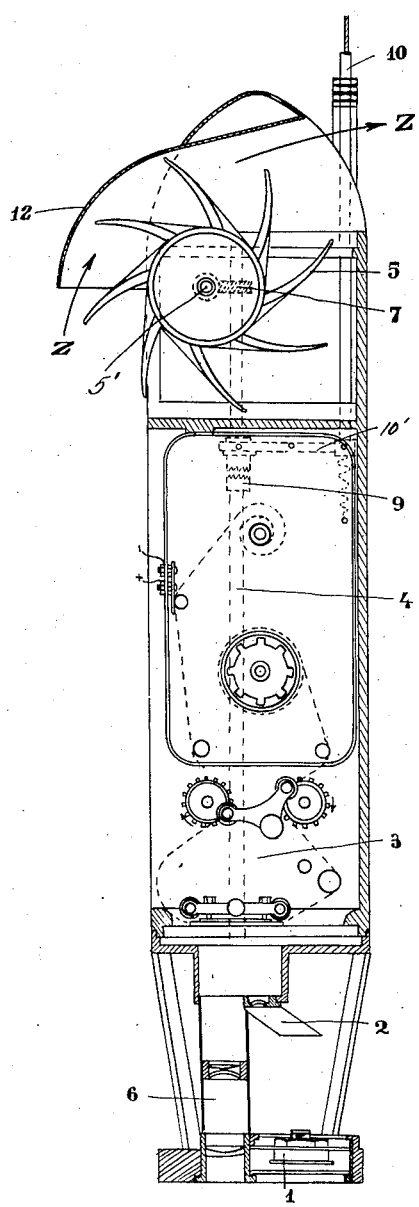
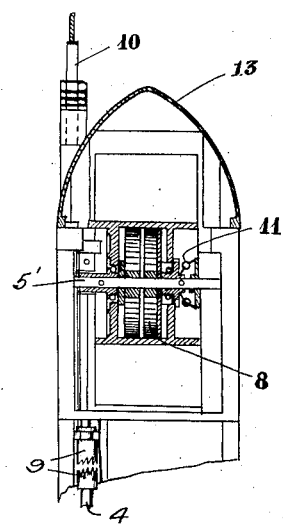

Dec. 19, 1933.　　　U. NISTRI　　　1,940,434
WIND DRIVEN PHOTOMACHINE GUN
Filed April 21, 1932　　2 Sheets-Sheet Inventor:
Umberto Nistri,
By [signature]
Atty.

Patented Dec. 19, 1933

1,940,434

UNITED STATES PATENT OFFICE 1,940,434

WIND-DRIVEN PHOTOMACHINE GUN

Umberto Nistri, Rome, Italy

Application April 21, 1932, Serial No. 606,751, and in Italy April 28, 1931

3 Claims. (Cl. 88—16)

It is well-known that during target firing practice by several aircraft in flight, a cinematographic mechanism is used of a shape and dimensions similar to an ordinary machine gun, said mechanism being known as "photo-machine gun".

This mechanism is driven by small electric motors, by clock works, or the like, connected with the control mechanism of the device through a flexible transmission, so that photographs of the target may be taken with the same rhythmical frequency as is found in the operation of machine guns which they replace.

The said mechanisms, which must include means for feeding at least 25 meters of film, when driven by electric motors or clock-work devices, become heavy and cumbersome, and consequently the mounting of them is rendered difficult, and when they are actuated by small air propellers through suitable flexible transmissions, the speed of their movement is dependent on the speed of the aircraft, which proves to be a drawback, inasmuch as the speed of the device may be either excessive or too slow, depending on the variations of the speed of the aircraft.

The present invention proposes improvements in said photo-machine guns, the object being to eliminate the drawbacks above referred to. According to the invention a little windmill is used applied direct to the rear part of the device, so as to remove all inconvenience to the operator and to eliminate at the same time all flexible connections of the transmission.

Said windmill is connected with the photo-machine gun through a spring device which commences to operate when the driving power of the wind decreases or ceases due to various causes and a substantially constant pre-determined speed of rotation is maintained, by means of an expanding centrifugal regulator.

In the annexed drawings which show diagrammatically, and by way of example an embodiment of the invention, Fig. 1 is a side view, partly in section of the photo-machine gun, while Fig. 2 is a fragmental sectional view of the rear portion containing the regulating devices.

Figure 3:
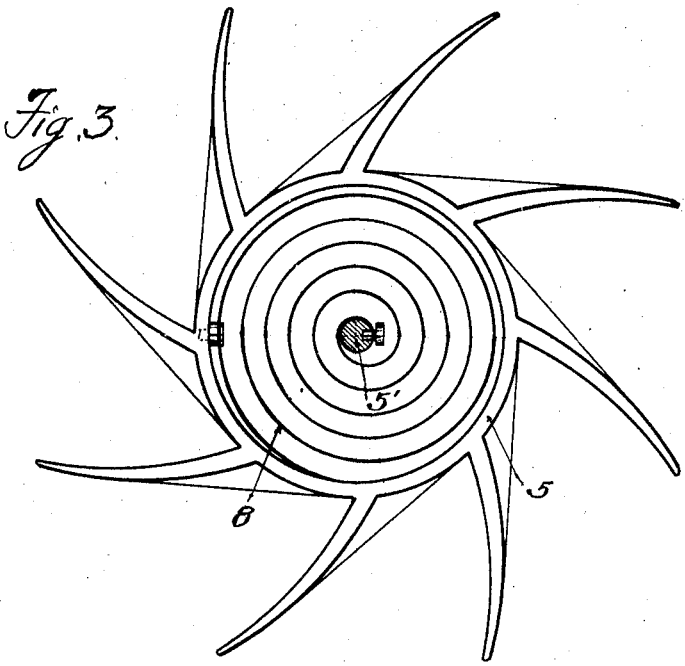
Figure 4:
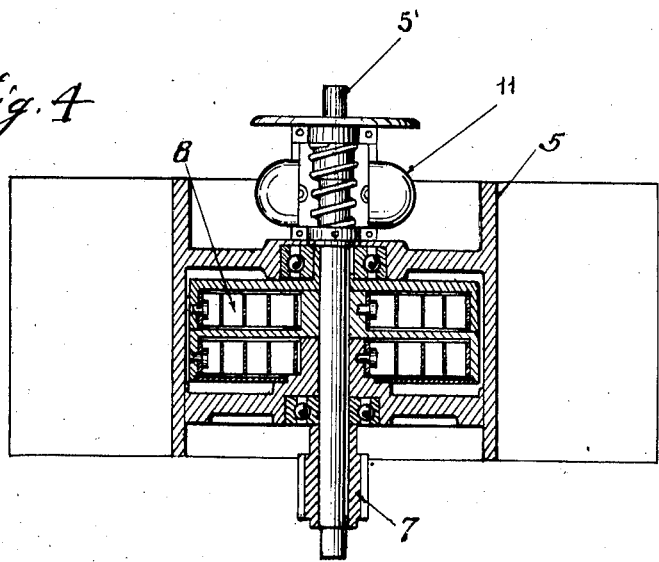

Fig. 3 is a front elevation of the windmill drawn to a larger scale and Fig. 4 is an enlarged scale view of the upper portion of Fig. 2 turned at an angle of 90°.

As shown in the drawings, a hair-cross placed in the focal plane, so as to coincide exactly with the sighting line, insures the precision of the sighting, while the dial of a chronometer (1), photographed simultaneously with the target by any suitable optical system (2) insures the chronometric registration of the shots.

The cinematographic mechanism (3) in a form adapted for this purpose, is connected with the main shaft (4) which, according to the invention, by means of suitable gearings, receives its movement from a windmill (5) mounted on a shaft 5' placed in a suitable housing provided in the rear portion of the casing of the machine. The said windmill consists of a bladed wheel enclosed in a housing (12) which protruds from a hood 13 on the casing, the blades being impinged upon by the wind passing through the hood in the direction of the arrows Z—Z. In this manner, the windmill is driven in the most effective manner.

The apparatus, which has its objective lens (6) in its front portion, is so mounted that its longitudinal axis, is disposed in the direction of the flight of the aircraft.

The relative wind pressure on the blades of the windmill produces its rotation, and by means of speed reducing gearings (7), the rotation is transmitted to the shaft (4).

As however, it may happen that in the course of its handling, the aircraft loses speed, and consequently the pressure of the wind also becomes insufficient to ensure the required velocity and power of the windmill, the latter is equipped inside with a system of coil springs (8) which form a compensating elastic connection between the windmill 5 and the shaft 5' on which the windmill is loosely mounted, the said springs having their ends secured respectively to the hub of the windmill and to the shaft 5'. The shaft 5' in turn is connected by means of the helicoidal gearing 7 to the main shaft 4 of the photo-machine, which is thus rotated. During the rotation of the windmill, by the wind pressure, the springs 8 are initially put under tension, up to a certain point of which they start driving the shaft 5', their tension beyond the said point becoming constant. If however the speed of the windmill is slowed down by any cause, the said springs begin to unwind thereby transmitting a part of the energy stored in them to the shaft 5' and thereby to the main shaft 4 geared with it, thus maintaining the uniformity of rotation of this latter.

The device is also provided (Fig. 2) with a centrifugal expansion regulator (11) mounted on the windmill shaft 5' which operates as a speed moderator of the windmill, or of its spring system, in a similar manner as in the ordinary spring motors.

The windmill rotates constantly when the aircraft is in flight, so that, as above stated, the system of springs is always under tension. The main shaft 4 consists of two parts, the upper one being positively driven by the windmill shaft 5' as above described, while the lower part is positively connected with the camera mechanism. The said two parts of the main shaft carry the cooperating members of a clutch 9 adapted to be operated by a rod 10 so as to operatively connect the two parts of the said shaft.

It is to be understood that the invention has been illustrated and described by way of example and that many variations may be made in the various parts, without departing from the main principle of the invention.

I claim:

1. In a photo-machine gun, in combination a casing, a camera mechanism carried thereby a main shaft rotatably mounted in said casing for operating said camera mechanism, a shaft operatively associated with said main shaft for rotating the same, and an aerodynamic windmill mounted on said last named shaft for driving the same, said windmill consisting of a bladed wheel mounted in said casing so as to project into a laterally projecting portion of said casing so as to permit the wind to impinge on said blades, the wind entering at the projecting portion of the casing, passing through the casing, and leaving through an outlet opening at the rear of said casing, the said outlet opening merging with the contour of said casing.

2. In a photo-machine gun, in combination a casing, a camera mechanism carried thereby a main shaft rotatably mounted in said casing for operating said camera mechanism, a shaft operatively associated with said main shaft for rotating the same, an aerodynamic windmill mounted on said last named shaft for driving the same, said windmill consisting of a bladed wheel mounted in said casing so as to project into a laterally projecting portion of said casing so as to permit the wind to impinge on said blades, the wind entering at the projecting portion of said casing, means comprising a set of compensating spiral springs having their ends respectively attached to said windmill and the shaft carrying the same, thereby insuring the rotation of said last mentioned shaft and said main shaft independently of the force of the wind, and a centrifugal regulator connected with the windmill shaft providing means for insuring the uniformity of rotation of said main shaft.

3. The combination as specified in claim 2, in which said main shaft comprises two parts, one being positively connected to the windmill shaft and the other part being positively connected to the camera mechanism, including a clutch comprising cooperating toothed members, one member on each part of said main shaft so as to connect the continuously rotating part of said main shaft with the part connected to the camera mechanism, and means for operating said clutch.

UMBERTO NISTRI.